US005688853A

United States Patent [19]
Salter et al.

[11] Patent Number: 5,688,853
[45] Date of Patent: Nov. 18, 1997

[54] WATER-BORNE SOIL RESISTANT COATINGS

[75] Inventors: Elizabeth A. Salter, Richmond, Australia; Craig D. Meekings, Bracknell, England; Bruce Leary, Red Hill, Australia

[73] Assignee: ICI Australia Operations Proprietary Limited, Melbourne, Australia

[21] Appl. No.: 619,560

[22] PCT Filed: Sep. 29, 1994

[86] PCT No.: PCT/AU94/00600

§ 371 Date: Jul. 8, 1996

§ 102(e) Date: Jul. 8, 1996

[87] PCT Pub. No.: WO95/09210

PCT Pub. Date: Apr. 6, 1995

[30] Foreign Application Priority Data

Sep. 29, 1993 [AU] Australia ............... PM 1526

[51] Int. Cl.$^6$ ................. C09D 133/08
[52] U.S. Cl. ................. 524/501; 524/500
[58] Field of Search ................. 524/500, 501

[56] References Cited

U.S. PATENT DOCUMENTS

| 4,069,186 | 1/1978 | Ramig ............... 260/29.6 RB |
| 4,385,152 | 5/1983 | Boyack et al. ............... 524/460 |
| 5,308,890 | 5/1994 | Snyder ............... 523/201 |

FOREIGN PATENT DOCUMENTS

| 80149/91 | 1/1992 | Australia. |
| 522789 | 1/1993 | European Pat. Off.. |

*Primary Examiner*—Edward J. Cain
*Attorney, Agent, or Firm*—Cushman Darby & Cushman IP Group Pillsbury Madison & Sutro LLP

[57] ABSTRACT

A soil resistant aqueous coating composition in which the binder consists of a blend of a low Tg polymeric dispersion and a high Tg polymeric dispersion. The PVC of the composition is less than the critical PVC and the Tg of the low Tg polymer dispersion is less than 0° C. and the Tg of the high Tg polymer dispersion is a least 35° C. and the volume ratio of low Tg polymer dispersion to high Tg polymer dispersion is from 0.4:1 to 1.4:1.

13 Claims, No Drawings

WATER-BORNE SOIL RESISTANT COATINGS

This application claims benefit of international application PCT/AU94/00600, filed Sep. 29, 1994.

TECHNICAL FIELD OF THE INVENTION

This invention relates to water-borne coatings and in particular to coatings that exhibit good soil resistance properties.

BACKGROUND OF THE INVENTION

The appearance of coatings can be adversely affected by atmospheric pollutants such as dirt, dust and carbon particles from combustion processes being deposited on the surface of a paint film. For example, a white paint film may become quite grey from atmospheric pollutants after exterior use in major industrial cities. In some industrial urban environments unacceptable soiling may take place within as short a period of time as several weeks. The problem of atmospheric soiling is obviously of greatest concern for exterior coatings.

In many cases the soiling of the paint film surface is not able to be rectified by washing by natural rainfall or artificial means. It is believed this relatively permanent soiling is due to the soiling particles becoming embedded in the paint film. This effect can be exacerbated by exposure in tropical climates where heat and high rainfall may contribute to softening of a thermoplastic paint film. It is believed a rough surface contributes to dirt particles becoming entrapped. In practice, however, it appears that gloss and semi-gloss paints which contain high levels of thermoplastic polymer latex binder exhibit the most severe soiling problems, particularly under hot and humid conditions.

Soil resistance needs to be distinguished from stain resistance which is a property more commonly associated with interior paints which are exposed to a range of domestic staining materials such as food, oil and beverages. Indeed paints that are good for stain resistance may be poor for soil resistance and vice versa. For example, water-borne semi-gloss latex paints generally are good for stain resistance and stain removal when used as interior paints. These paints have good mar resistance and wet and dry scrub performance and this enables the stained or dirtied surface to be cleaned by scrubbing without causing the treated area to "gloss up" and exhibit a gloss that is different from the surrounding area. However, when used as exterior paints these same paints can have poor soil resistance.

For exterior paints various methods have been proposed to improve their soil resistance. One method is to use a self cleaning paint film which, while it may become dirty to a similar extent to a standard paint surface, cleans itself by the surface of the paint film being eroded on exposure to the combined effects of atmospheric oxygen, UV radiation and rainfall. This erosion exposes a new surface with clean appearance. These coatings are also known as self chalking paints. Whilst overcoming the problems of soiling to a certain extent they suffer from the problem of still becoming soiled and remaining so until film degradation leads to the apparent cleaning of the surface. As discussed previously, unacceptable soiling can take place in a matter of weeks, yet erosion by degradation is a relatively slow process taking many months before it becomes significant. Another obvious deficiency with such coatings is that because the coating film is gradually being eroded the gloss of the film is reduced with time and also more frequent repainting is required. They are thus less suitable in gloss and semi-gloss formulations.

Another approach to achieving soil resistant exterior coatings has been to modify the surface of a coating film so that the adhesion of soiling particles to the surface is reduced. In an article "A Soil Resistant Treatment For Low Gloss Coatings" by D. L. Gauntt et al, Journal of Coating Technology, Vol 63 No. 803 page 25 December 1991, a treatment suitable for use on military aircraft is described. This article details the use of an unpigmented colloidal silica treatment to be applied to an existing paint film. It is proposed that good soil resistance is achieved in practice because the surface charge of the resultant film is changed such that atmospheric particles are less strongly attracted and adhered to the surface, thus enabling much easier clean up. Whilst promising results are reported in this article such systems suffer from the obvious disadvantage of requiring an additional coating to be applied and furthermore this teaching is directed to low gloss coatings because of the use of colloidal silica extenders.

A further approach to dirt pick up resistant coatings is disclosed in EP 0 522 789 A2. This specification relates to high film build elastomeric coatings. Improved soil resistance is achieved by combining polymers of different Tg's within the one polymeric dispersion particle, providing an outer shell of harder polymer around a softer inner polymer core, and including photochemical crosslinking. These coatings are promoted for high film build applications and are not recommended for use at the lower film builds of conventional paints. When used at these lower film builds dirt pick up is reported in Rohm and Haas promotional literature to be poor.

Australian patent application AU-A-80149/91 by Rohm and Haas Company relates to film forming binders which are a blend of emulsion polymers and paints formulated from such binders. The blends consist of a least two emulsion polymers, a hard emulsion polymer having a Tg greater than 20° C. and a soft emulsion polymer having a Tg less than 20° C. The compositions described in this Rohm and Haas specification are claimed to be particularly useful in providing good block resistance when formulated as interior semi-gloss paints whilst retaining good film formation properties at low temperatures. No statement is made about soil resistance or use on exterior surfaces. At page five of this specification the inventors explain that if a soft emulsion polymer is blended with increasing amounts of a hard emulsion polymer, the minimum film forming temperature (MFFT) of the blend will remain about equal to the MFFT of the soft polymer until the hard polymer is about 50 weight percent of the polymer blend. As it is important for their compositions to have good low temperature film coalescence the preferred binder compositions have 60% by weight soft and 40% by weight hard polymer. In their examples the soft to hard latex polymer ratio varies from 4:1 to 1.5:1 and the soft polymers are said to have a MFFT greater than 0° C. In view of the high level of soft polymer these compositions when used as exterior coatings would not be expected to have good soil resistance properties. The inclusion of the hard latex is believed to provide the good block resistance properties desired for interior semi-gloss paints. The property of soil resistance does not necessarily correlate with film hardness and paints of equal hardness can demonstrate significantly different soil resistance.

U.S. Pat. No. 5,308,890 of Snyder published 3 May 1994 discloses coating compositions consisting of blends of a multistage core-shell dispersion polymer and a non-film forming dispersion polymer. This patent is directed towards obtaining harder films which are coalescent-free. Again, as for the previously discussed Australian patent application the preferred and exemplified embodiments demonstrate that beneficial properties are achieved when the weight percentage of the non-film forming dispersion polymer is from 20 to 40% of the binder composition. Whilst the examples illustrate improved hardness and associated properties, they do not mention soil resistance which would be predicted to be poor in view of the high level of soft polymer.

Japanese Patent J 5 9215-365-A in the name of Nippon Acryl Kagaku discloses compositions obtained by mixing 35–45 wt % acrylic resin emulsion of Tg 25 to 50 degrees C. and 55–65 wt % acrylic resin emulsion of Tg –10 to +15 degrees C. These compositions thus have a soft to hard ratio of 1.9:1 to 1.2:1. These compositions also have a plasticiser which may be volatile. Whilst these paints have particular application as ventilator coatings to prevent the smearing of the surface, anti-soil properties are not examined, though they would be expected to be poor.

U.S. Pat. No. 4,385,152 of Boyack et al discloses emulsion coatings for coating uncured cementitious substrates. The compositions consist of a blend of a multi-stage first polymer dispersion and a second polymer dispersion. The multi-stage polymer dispersion has a hard core and soft outer shell. It is a requirement for this invention that both polymer dispersions are film forming at ambient temperatures. Blends of these two dispersions are claimed to lead to improved dirt pick up resistance when applied to cementitious substrates.

U.S. Pat. No. 4,069,186 of Ramig discloses paint compositions having film forming latex binder, non-film forming plastic polymer particles and opacifying pigment. These paint compositions have a pigment-volume-content (PVC) greater than the critical PVC as measured by opacity. Indeed it is an object of that invention to provide paints with improved opacity whilst maintaining excellent film integrity properties. The paints are intended for use as interior low gloss high opacity paints. Preferred paints are formulated such that the PVC is greater than the critical PVC, as measured by opacity, but less than the critical surface porosity PVC, as measured by enamel hold out. The non-film-forming particles used in this prior art invention are explained at column 6 line 61, as being preferably polystyrene and indeed this is consistent with the examples which are limited to polystyrene, polymethylmethacrylate and polyvinylchloride. Most of the examples use polystyrene particles which is consistent with the intended interior application for these coatings where the relatively poor exterior durability of polystyrene would not be relevant. Not surprisingly, in view of the intended application, no testing as anti-soil exterior paints is mentioned.

U.S. Pat. No. 4,283,320 of Carroll et al has the same assignee as the patent of Ramig and discloses opacified latex semi-gloss paint comprising film forming latex binders combined with minor amounts of opacifying pigment and substantial amounts of non-film-forming polymeric particles. The compositions as defined in claim 1 include 55 to 70% of film-forming polymer particles. Accordingly if the non-film-forming particles are regarded as hard particles the ratio of soft to hard particles is from 7:1 to 2.2:1 in this prior art invention. The Tg of the film forming particles is at least 5° C. for ordinary room temperatures. Again no testing of the compositions as soil resistant exterior coatings is reported but they would be expected to be poor because of the large proportions of soft polymeric particles.

SUMMARY OF THE INVENTION

This invention provides in one form an aqueous coating composition comprising a blend of a low Tg and a high Tg aqueous polymeric dispersions characterised in that: the PVC of the coating composition as measured by opacity is less than the critical PVC, the polymer dispersion with low Tg has a Tg less than 0° C., the polymer dispersion with high Tg is non film forming and has a Tg of at least 35° C. and the volume ratio of low Tg polymer dispersion to high Tg polymer dispersion is from 0.4:1 to 1.4:1.

Preferably the volume ratio of low Tg polymer dispersion to high Tg polymer dispersion is from 0.6:1 to 1.2:1 and more preferably 0.7:1 to 1.1:1.

DETAILED DESCRIPTION OF THE INVENTION

A commonly used characterising parameter for latex paints is the pigment-volume-content (PVC) which is the percent by volume of pigment present in the dried paint film relative to the total volume of the dried paint film. The term pigment includes mineral opacifiers such as $TiO_2$ and ZnO as well as extender particles and non deformable "plastic" pigments. At a certain PVC, the volume of pigments in the paint film abruptly causes considerable air voids in the dry paint film due to binder deficiency. The PVC measurement at this level of pigment content is characterised as critical PVC wherein a binder deficiency occurs such that insufficient binder is present in the paint film to encapsulate the pigment particles and fill any remaining voids in the film. At the onset of such porosity in the paint film due to binder deficiency, opacity or hiding characteristics of the paint film increases abruptly. This point is termed the critical-PVC as measured by opacity and is referred to hereinafter as the CPVC (opacity).

In coatings, as described in the present invention, the high Tg aqueous dispersion under some circumstances may contribute to the PVC of the paint depending on the extent of deformability of the particles. The coatings of the present invention must have PVC's less than the CPVC (opacity) to achieve the required mechanical film properties. The CPVC (opacity) is determined experimentally by a PVC ladder. A PVC ladder series of experiments leads to a graph relating the opacity of dried paint films as a function of pigment-volume-content (PVC). The PVC is varied by changing the relative volume of the binder by adding or subtracting a given pigment component while maintaining the volume percent of other pigment components constant. To determine whether the high Tg dispersion of the present invention is acting as a "plastic pigment" the ladder series is developed by varying the relative proportions of high and low Tg dispersions.

The actual PVC of the compositions of the present invention may be difficult to calculate as the extent of deformability of the high Tg dispersion may change. However the practical CPVC (opacity) may be measured by increasing the proportion of high Tg dispersion relative to the low Tg dispersion to ascertain the CPVC (opacity). The coating compositions of the present invention are always below the CPVC (opacity) and this can be established experimentally.

The aqueous dispersions, both high and low Tg of this invention are usually copolymers of addition polymerisable ethylenically unsaturated comonomers. Examples of useful comonomers include alkyl acrylates and methacrylates where the alkyl group has 1 to 20 (and more preferably 1 to 8) carbon atoms, styrene, vinyl acetate, acrylonitrile and simple or substituted olefines such as butadiene and ethylene. However, as the major application for soil resistant compositions is as exterior paints, monomers of known good exterior durability are preferably used. For example, monomers such as methyl methacrylate and butyl acrylate and similar alkyl acrylate and methacrylate esters are preferred. Monomers containing other functional groups such as hydroxyl or carboxyl groups may be used. Minor amounts of functional monomers such as ureido, amine or acetoacetate containing monomers directed towards specific objectives such as adhesion promotion or crosslinking may also be incorporated. The selection of comonomers and their relative proportions is based on well established principles in the art and generally balance properties such as exterior durability, toughness and hardness with cost. Preferred compositions include acetoacetate functional groups, particularly prepared by copolymerising acetoacetoxyethyl methacrylate (AAEM) monomer, preferably at least 0.5% and more preferably at least 2.0%.

The molecular weight of the copolymers is generally similar to known latexes and typically would be at least 25,000 (Mn). A gelling structure in the particles is permitted in a similar fashion to the gel structure of known commercial latexes. In some cases it is desirable to enhance the gel structure by including minor amounts of polyfunctional acrylate or methacrylate monomers provided film formation is not unacceptably compromised.

The aqueous dispersions of the present invention may be prepared by known means, for example emulsion polymerisation. Good results are achieved when the aqueous dispersion is prepared such that it is sterically stabilised. The term sterically stabilised is an art recognised term in colloid science and means that, in aqueous systems, colloidal stability is conferred by the presence of a sheath of water soluble polymeric or uncharged oligomeric chains anchored to the particle surface. By sterically stabilised dispersions we mean that whilst other types of stability, such as anionic or cationic, may be present there is also colloidal stability conferred by steric stabilisation. For the purposes of this invention a convenient test to ascertain whether the dispersion is sterically stabilised or not is to increase the ionic concentration of the aqueous phase to such an extent that ionic stabilisation is nullified and then to assess the stability of the dispersion.

Examples of the preparation of dispersions suitable for the working of the present invention are described in Australia Patent No. 618,176. Also within the scope of the present invention are polymer dispersions which have a core/shell structure whereby either the hard particles or soft particles or both are structured so that the outer shell of the particle differs in polymer composition from that of the centre of the particle. Polymer particles that include voids are also within the scope of the present invention.

The aqueous dispersions usually give thermoplastic films. However within the scope of the present invention are crosslinkable polymer dispersions where cross-linking takes place after film formation. Examples are well known in the art and particularly useful examples are described in our copending Australian patent application entitled "Crosslinkable Aqueous Coating-Compositions" No. PM1525.

An important characteristic of the two aqueous dispersions that contributes to the working of the present invention is their glass transition temperatures (Tg). The term "glass transition temperature" is a term well known in the art and generally defines the onset of long range molecular motion wherein the polymer preserves the outward appearance of a solid but becomes rubbery and then tacky with increasing temperature and undergoes plastic flow and elastic deformation. The theoretical Tg is often calculated in accordance with the Fox equation $1/Tg=Wi/Ti$. However, the glass transition temperatures are best determined by measurement. Glass transition temperature can be measured in accordance with the differential thermal analysis method set out in the Journal of Paint Technology, Volume 41, pages 167–168 (1969) or by testing for softening points, using a minimum film forming temperature gradient bar or thermomechanical analysis (TMA) or differential scanning calorimetry (DSC). In practice we find in most cases that the Tg as determined by different methods is close to the theoretical Fox Tg. However in some cases significant variations can occur and in those instances we prefer to use Tg as measured on each dispersion, either during film formation using a thermal gradient bar (MFFT), by DSC or by TMA measurements on dried films. Our preferred method is by TMA.

The low Tg dispersion should have a Tg of 0° C. maximum, although better film properties are achieved when the Tg is −60° to −5° C. and more preferably −20° to −10° C.

It is surprising that soil resistant coatings can be based on such a low Tg polymer as it would seem that a Tg lower than normally used in a coating composition, 5°–15° C., would lead to coatings that are poor for soil resistance as dirt particles would be expected to be more readily embedded in the surface. Not only are soil resistant coatings obtained in the present invention despite using unusually low Tg latex particles but in most applications coatings can be achieved that do not require the addition of volatile plasticisers. As paints containing normal levels of volatile coalescents tend to be poor for soil resistance preferred paint compositions are free of organic solvents and coalescents. Accordingly coatings can be prepared that comply with the zero VOC requirement for low pollution paints.

The high Tg non film forming dispersion of the present invention has a Tg of at least 35° C., preferably 40°–110° C., and more preferably 45°–90° C. and most preferably 50°–70° C. There should be a difference of at least 35° C., preferably 45° C., and more preferably at least 55° C. between the Tg's of the two polymeric dispersions. It will be appreciated that the upper limit in Tg is also influenced by the requirement that the PVC of the coating is below the critical PVC as measured by opacity. For example, if the high Tg dispersion comprised polystyrene particles, paints formulated at or above the CPVC (opacity) as in the US patent of Ramig previously discussed are not included in the coatings of the present invention. In this specification the term non film-forming means that at 20° C. a wet film cast on a substrate fails to form a continuous film.

The relative proportion of the low and high Tg dispersions is most important to the working of the present invention and we require that the volume ratio of low Tg polymeric dispersion to high Tg polymeric dispersion to be from 0.4:1 to 1.4:1. This is of course calculated on a non-volatile basis. In practice there is usually little difference between the weight and volume ratios. If the particles are based on the same monomers it is convenient to use the weight ratios as the densities of the particles are essentially the same.

At ratios above the 1.4:1 upper limit the soil resistance of paint films becomes unacceptably poor. As is demonstrated in later comparative examples soil resistance at a ratio of 1.5:1 is very poor. At ratios below 0.4:1 film properties such as ability to coalesce satisfactorily at low temperatures is adversely affected.

The compositions of the present invention are particularly suitable for gloss and semi-gloss paints. In conventional latex paints the low PVC of these type of coatings can lead to poor soil resistance. For these types of paints we have found it to be advantageous to use small particle size polymer dispersions, especially for the high Tg polymer dispersion. The particle size of both the low and high Tg particles should preferably be less than 200 nm in diameter, more preferably less than 150 nm and most preferably less than 100 nm. Preferred paints have a gloss of at least 10 (60° head) and more preferably 40 (60° head).

Whilst the major portion of the binder in this invention is the combination of a low Tg and high Tg polymer dispersion as described above, other binders may be included. If a third polymeric dispersion is included it may be regarded as a high or low Tg dispersion if its Tg meets the criteria set out above. For example within the scope of the present invention are binders of polymer dispersions of −15° C. (40%), −10° C. (10%) and +50° C. (50%). In this case both the −15° C. and −10° C. dispersions are regarded together as the low Tg, and in this case the low Tg to high Tg ratio is 1:1. Furthermore minor amounts of dispersions that are neither low or high Tg as defined in this invention may be used as well as minor amounts of solution polymers and other additives as used in art recognised quantities.

Unpigmented or clear coatings and pigmented stains are also embraced within the scope of the present invention. Normally the PVC of pigmented coatings is approximately 20 to provide the required level of gloss and opacity. In the case of unpigmented coatings we have found the same beneficial soil resistance properties. In practice, for best results, slightly higher levels of high Tg particles are used for clears. Although soil resistant properties are of most advantage in exterior coatings, the compositions of the present invention also have application as interior paints.

The invention will be further described by reference to the following examples of preferred embodiments.

Example 1

This example illustrates the preparation of a semi-gloss paint according to the invention and its evaluation.

A. Preparation of aqueous dispersion of Fox Tg −15° C.

| Material | Wt % |
|---|---|
| A Fatty alcohol ethoxylate surfactant* | 1.265 |
| Water | 7.406 |
| t-butyl perbenzoate | 0.380 |
| 30% hydrochloric acid | trace |
| B Ferrous sulphate | 0.009 |
| Water | 0.940 |

*As described in Example 3 of International Patent Application No. PCT/AU90/00565.

| | Feed 1 | Feed 2 | Feed 3 |
|---|---|---|---|
| C Methyl methacrylate | 2.08 | 3.66 | 11.53 |
| Butyl acrylate | 3.32 | 6.16 | 19.37 |
| Adhesion promoting monomer* | 0.18 | 0.28 | 0.89 |
| Fatty alcohol ethoxylate surfactant | 0.76 | 0.49 | 1.02 |
| Water | 5.15 | 7.86 | 24.94 |
| D Sodium Erythorbate | 0.03 | 0.04 | 0.14 |
| Water | 0.28 | 0.44 | 1.39 |

*1-{2-[N-(2-hydroxy-3-methacryloxypropyl)-μ(2 hydroxybutyl)] aminoethyl}-2-imidazolidinone (35% w/w in propylene glycol/isopropanol) as described in Australian Patent 557,116.

A stage was added to a vessel equipped with stirrer, condenser and feed facilities and heated to 70° C. with stirring under a nitrogen blanket.

D stage was made up as a stock solution. Feeds stages C1, C2 and C3 were each premixed and separately emulsified under high shear and D stage added. B stage was added to A stage and stirred for 10 minutes prior to starting C stage feeds. C1 was fed over 50 minutes, C2 over 45 minutes and C3 over 120 minutes maintaining the reaction temperature at 70° C. At the end of the feeds, the reaction mixture was allowed to cool to room temperature. The solids of this dispersion was 51% by weight and the particle size (Dn) was 80 nm. It had a MFFT <0° C. (crack point) and TMA Tg of −16° C. This dispersion was designated dispersion 1A.

B. Preparation of aqueous dispersion of Fox Tg +70° C. The method of preparing dispersion 1A was repeated except that the C stage feeds were as follows.

| | Feed 1 | Feed 2 | Feed 3 |
|---|---|---|---|
| C. Methyl methacrylate | 5.27 | 8.47 | 26.38 |
| Butyl acrylate | 0.84 | 1.35 | 4.05 |
| Adhesion promoting monomer | 0.18 | 0.29 | 0.90 |
| Fatty alcohol ethoxylate surfactant | 0.77 | 0.50 | 1.01 |
| Water | 5.18 | 7.76 | 25.01 |
| Sodium erythorbate | 0.03 | 0.04 | 0.14 |
| Water | 0.28 | 0.44 | 1.39 |

This dispersion had a solids content of 51% and a particle size of 91 nm. It had a MFFT of 60° C. and TMA Tg of 54° C. It was designated dispersion 1B.

C. Preparation of semi-gloss paint having a ratio of low Tg to high Tg polymeric dispersion of 0.8 to 1.0.

| Material | Wt % |
|---|---|
| A Water | 8.000 |
| Proxel GXL (biocide) | 0.080 |
| Bevaloid 4226 (antifoam) | 0.200 |
| Triton X405 (octyl phenol ethoxylate surfactant) | 0.122 |
| AMP95 (amino methyl propanol dispersant) | 0.244 |
| Zincweiss 2011 (zinc oxide pigment) | 3.997 |
| RTC90 (titanium dioxide pigment) | 23.170 |
| B Water | 9.888 |
| Dispersion blend (45% 1A and 55% 1B) | 52.357 |
| C Acticide EP (fungicide) | 1.000 |
| 75% QR 708 in ethanol (associative thickener) (ex Rohm and Haas) | 0.940 |

The materials from stage A were added sequentially with stirring and then under high speed stirring were dispersed for 10–15 minutes to achieve good pigment dispersion.

The millbase was gradually let down with B stage water, the dispersion blend from stage B was then added and the mixture stirred for 10 minutes. Fungicide from Stage C was added and then the thickener was gradually added in a pencil thin stream, the stirrer speed being increased as the viscosity increased. The paint was stirred at a moderate speed for a further 10 minutes to give a paint with volume solids 40%, weight solids 54.4, PVC 21%, WPL of 1.325 and pH 8.5. This paint was designated paint 1C. This paint was tested and found to be well below the CPVC (opacity).

D. Evaluation of the paint 1C.

Paint 1C (two coats) was applied to cement sheet and exposed on a factory roof at 45° to the horizontal for three months in Kuala Lumpur, Malaysia. The initial gloss was 27 (60° head). After this period the panel was visually assessed for dirt pick up and rated as good relative to a conventional premium low sheen exterior latex paint which was rated as fair.

Example 2

This example illustrates the application of the invention to a semi-gloss paint where the ratio of low Tg to high Tg polymeric dispersion is 1 to 1.

A paint was prepared as for paint 1C except that the ratio of dispersions 1A and 1B was 1 to 1. This paint was tested and found to be below the CPVC (opacity). This paint when tested as in 1D had an initial gloss of 30 (60° head) and was rated as good for soil resistance.

Examples 3–9

These examples illustrate the use of a polymer dispersion that includes acetoacetate monomer as the adhesion promoting monomer and which include a range of different Tg's for the high Tg dispersion and which also include a number of ratios of low Tg to high Tg dispersions.

A Preparation of an aqueous dispersion of Fox Tg −14° C. The materials and method of 1A were repeated except that C stage was as follows:

|  | 1 | 2 | 3 |
|---|---|---|---|
| C. Methyl methacrylate | 2.13 | 3.43 | 10.81 |
| Butyl acrylate | 3.74 | 6.02 | 18.94 |
| Adhesion promoting monomer* | 0.31 | 0.50 | 1.57 |
| Fatty alcohol ethoxylate surfactant | 0.77 | 0.50 | 1.01 |
| Water | 5.23 | 7.93 | 24.27 |

*Acetoacetoxyethyl methacrylate

This dispersion had a particle size of 90 nm and was designated 3A. The MFFT was <0° C. and the TMA Tg was −12° C.

B Preparation of an aqueous dispersion of Fox Tg +67° C. The materials and method of 1B were repeated except that C stage was as follows:

|  | 1 | 2 | 3 |
|---|---|---|---|
| C. Methyl methacrylate | 5.44 | 8.31 | 26.15 |
| Butyl acrylate | 0.75 | 1.14 | 3.60 |
| Adhesion promoting monomer* | 0.31 | 0.50 | 1.57 |
| Fatty alcohol ethoxylate surfactant | 0.77 | 0.50 | 1.01 |
| Water | 5.31 | 7.97 | 24.66 |

*Acetoacetoxyethyl methacrylate

This dispersion was designated 3B and had a particle size of 95 nm. It had a MFFT of >60° C. and a TMA Tg of 52° C.

C. Preparation of aqueous dispersions of Tg's +30° C., +50° C., +90° C.

The process of preparing dispersions 3A and 3B was repeated except that the relative proportions of methyl methacrylate and butyl acrylate were adjusted in turn to provide theoretical (Fox equation) Tg's of +30° C., +50° C. and +90° C. These dispersions each contain 5% AAEM as for dispersions 3A and 3B. The dispersions of Tg's +30° C., +50° C., +90° C., were designated 3C, 3D and 3E respectively. The respective particle sizes were 93 nm, 83 nm and 106 nm. The TMA Tg's were 49° and 82° C. for dispersions 3D and 3E.

D. Paints were prepared as in Example 1 using the ratios of low Tg to high Tg dispersions as shown in the table below.

In all examples the low Tg dispersion was 3A with a Fox Tg of −14° C. Results for soil resistance when assessed as in Example 1 are also shown. All paints were tested and found to be below the CPVC (opacity). Those within the scope of the present invention exhibit an excellent balance of properties. Satisfactory soil resistance was also exhibited by a paint prepared from dispersions 3A and 3B at a ratio of low Tg to high Tg of 1.2:1.

| Example No. | Tg of high Tg dispersion | Ratio of low Tg to high Tg dispersion | Gloss (60°) | Soil Resistance Rating |
|---|---|---|---|---|
| 3 | 3E(+90° C.) | 0.8:1 | 9 | Very Good |
| 4 | 3B(+67° C.) | 0.8:1 | 30 | Very Good |
| 5 | 3D(+50° C.) | 0.8:1 | 36 | Very Good |
| 6 | 3D(+50° C.) | 1:1 | 38 | Good |
| 7* | 3C(+30° C.) | 0.8:1 | 51 | Poor |
| 8* | 3E(+90° C.) | 2.3:1 | 19 | Fair |
| 9 | 3D(+50° C.) | 0.7:1 | 35 | Very Good |

*Comparative examples, not according to the invention.

Example 10

This example illustrates the good soil resistance properties according to this invention when formulated as a gloss paint.

A. A gloss paint was formulated and prepared as below.

| Material | Wt % |
|---|---|
| A Water | 6.000 |
| Proxel GXL (biocide) | 0.080 |
| Bevaloid 4226 (antifoam) | 0.200 |
| Triton X405 (octylphenol ethoxylate surfactant) | 0.107 |
| AMP95 (amino methyl propanol dispersant) | 0.214 |
| RTC90 (titanium dioxide pigment) | 23.170 |
| B Water | 12.115 |
| Dispersion blend (50% dispersion 3A and 50% dispersion 3D) | 56.164 |
| C Acticide EP (fungicide) | 1.000 |
| 75% QR 708 in ethanol (associative thickener) | 0.950 |

The materials from stage A were added sequentially with stirring and then under high speed stirring were dispersed for 10–15 minutes to achieve good pigment dispersion.

The millbase was gradually let down with B stage water, the dispersion blend from stage B was then added and the mixture stirred for 10 minutes. Fungicide from Stage C was added and then the thickener was gradually added in a pencil thin stream, the stirrer speed being increased as the viscosity increased. The paint was stirred at a moderate speed for a further 10 minutes to give a paint with 40% volume solids, PVC of 19%, pH 8.5, 53% solids by weight and a WPL of 1.282. This paint was designated 10A.

B. Paint 10A was evaluated as in Example 1, had an initial gloss of 57 (60°) and was rated as good for soil resistance compared to a commercial paint of similar PVC and gloss level which was rated as very poor.

Example 11

This example illustrates the preparations and testing of a gloss paint based on polymeric dispersions prepared using anionic surfactants.

A. A polymeric dispersion of Fox Tg −13° C. was prepared as follows.

| Material | Wt % |
|---|---|
| A Water | 43.558 |
| RK500 (Polyoxyethylene hexyl ether phosphate) | 0.900 |
| Disodium orthophosphate | 0.102 |
| Sodium hydroxide | trace |
| B Methyl methacrylate | 0.785 |
| Butyl acrylate | 1.271 |
| Acetoacetoxyethyl methacrylate | 0.108 |
| C Ammonium persulphate | 0.136 |
| Water | 0.370 |
| D Sodium 2-acrylamido 2-methyl propane sulphonic acid | 0.904 |
| Water | 5.941 |
| E Methyl methacrylate | 15.626 |
| Butyl acrylate | 25.257 |
| Acetoacetoxyethyl methacrylate | 2.152 |
| F Fatty alcohol ethoxylate surfactant | 2.500 |
| G Water | 0.113 |
| Sodium formaldehyde sulfoxylate | 0.014 |
| H Water | 0.113 |
| t-butyl perbenzoate | 0.023 |
| I Water | 0.113 |
| Sodium formaldehyde sulfoxylate | 0.014 |

A stage was loaded to a reaction vessel equipped with stirrer, nitrogen blanket and feed facilities. The charge was heated to 75° C. B stage was then added with stirring and the pH was adjusted to 9. C stage was added and at the completion of the exotherm D and E stages were fed concurrently over four hours, the temperature being maintained at 75° C. throughout. F stage was added during the final 15% of E stage. The reaction charge was maintained at 75° C. for a further fifteen minutes at the conclusion of D, E and F stages and then stages G, H and I were added at 10 minute intervals.

The solids of this dispersion (10A) was 49.5%. The particle size was 100 nm, MFFT <0° C. and TMA Tg was −8° C.

B. A polymeric dispersion of Fox Tg +53° C. was prepared as for 11A except that stages B and E were as follows

| B Methyl methacrylate | 1.633 |
|---|---|
| Butyl acrylate | 0.424 |
| Acetoacetoxyethyl-methacrylate | 0.108 |
| E Methyl methacrylate | 15.626 |
| Butyl acrylate | 25.257 |
| Acetoacetoxyethyl methacrylate | 2.152 |

After polymerisation this dispersion 11B had a solids content of 49.5% and particle size of 88 nm. The MFFT was >60° C. and the TMA Tg was 53° C.

C. A gloss paint was prepared as in Example 10 with 50% each of dispersions 11A and 11B. This paint when tested as in Example 10 was rated as very good for soil resistance. The paint had an initial gloss of 62 (60° head).

Example 12

This example illustrates the use of a crosslinkable binder:

A semi-gloss paint was prepared as in Example 1 using dispersions 3A (Tg −15° C.) and 3B (Tg +67° C.) at a ratio of 0.8 to 1, except that 0.9 parts of the combined dispersions (non-volatiles) was replaced with 0.9 parts of Jeffamine ED600 crosslinker, which was added as part of B stage. This level of amine crosslinker provided a mole ratio of acetoacetate to $NH_2$ of 2 to 1.

This paint when tested as in Example 2 had an initial gloss of 31 (60°) and was rated as very good for soil resistance.

Example 13

This is a comparative example which is outside the scope of the present invention.

A semi-gloss paint was prepared in accordance with Example 1 except that the low Tg dispersion (1A) was replaced with equal parts by weight of a dispersion of Tg +12° C. This paint required the addition of 2% Texanol coalescent to overcome film formation problems. This paint was rated as being very poor for soil resistance.

Example 14

This is a comparative example which is outside the scope of the present invention.

A semi-gloss paint was prepared in accordance with Example 1 using a Fox 0° C. Tg dispersion as the low Tg polymer dispersion and a Fox +70° C. Tg dispersion as the high Tg polymer.

This paint cracked severely and was incapable of forming a useful film at low temperatures (7° C.) and was therefore not tested for soil resistance.

Examples 15–18

Examples 15 and 16 illustrate improved soil resistance in unpigmented clear coatings according to the present invention. Examples 17 and 18 are comparative examples outside the scope of the present invention.

Clear coating compositions were prepared by combining low Tg (−15° C.) acrylic polymer dispersion with a higher Tg (+60° C.) acrylic polymer dispersion in the ratios as set out below. Texanol** coalescent was added to obtain well coalescent films. The blends were applied over a white substrate, exposed for 4 weeks in Kuala Lumpur, and measured for soil resistance by reflectance.

| Example No. | Texanol Coalescent | Composition, low Tg:high Tg | Soiling Density++ |
|---|---|---|---|
| 15 | 2.5% | 0.54:1 | 1.63 (pass) |
| 16 | 1.0% | 0.8:1 | 2.37 (pass) |
| 17* | — | 1.5:1 | 3.95 (fail) |
| 18* | 2.0% | Revacryl 4176+ | 3.89 (fail) |

**Eastman Chemical Co
+Commercial acrylic latex (Revertex)
*Comparative examples
++Calculation of Soiling Density
Soiling Density = $100 \times Log_{10}(L*_A/L*_B)$
$L*_A$ = Initial L* value
$L*_B$ = L* value at four weeks The smaller the value obtained for soiling density the better the result.

L* value is the perception of lightness and darkness and is calculated from measured reflectance as defined by the International Committee on Illumination in CIE publication No. 15 supplement 2.

These examples illustrate good soil resistance for unpigmented compositions within the scope of the present invention.

Example 19

This is a comparative example which illustrates the poor soil resistance when the low Tg to high Tg ratio exceeds 1.4:1.

Latexes where prepared in accordance with examples 3 and 4 Australian Patent application AU-A-80149/91 by Rohm and Haas Company. Example 3 had a Fox Tg of −7.2° C., a TMA Tg of −1° C., a solids content of 47.7% and a particle size of 85 nm. Example 4 had a Fox Tg of 42.5° C., a TMA Tg of 55° C., a solids content of 46.7% and a particle size of 80 nm. A paint was prepared and tested as in Example 10 above except 1.5% Texanol was needed to obtain good film coalescence with a ratio of low Tg to high Tg particles of 1.5:1 and hence outside the scope of the present invention but a preferred ratio for the Rohm and Haas application. The soil resistance was rated as very poor. The 60° C. gloss of the paint was 67.

Example 20

This example illustrates the use of a carboxylated acrylic terpolymer latex as the low Tg polymer dispersion. A commercial latex (National Starch 278-6212) was used as the low Tg dispersion in Example 10. The latex had a solids content of 50%, particle size 200–300 nm and TMA Tg of −9° C. The supplier's literature value of the Tg was quoted as −15° C. The paint had a 60° C. gloss of 32 and after testing was rated as very good for soil resistance.

Example 21

This example is within the scope of the present invention and illustrates the use of colloid stabilised latexes. Paints were prepared at a PVC of 21%, a volume solids of 41% with a ratio of low Tg to high Tg dispersions of 0.7:1 using latexes prepared from a combination of PEG oleic acid monoester, sodium dodecyl sulphosuccinate and a cellulose derivative colloid. The paints included 2% Texanol plasticiser. The characteristics of the latexes were as follows:

|  | MMA | 2-EHA | MAA | Tg (DSC) | Particle Size |
| --- | --- | --- | --- | --- | --- |
| low Tg dispersion (Fox Tg −18° C.) | 42.9 | 56.2 | 0.9 | −5 | 554 nm |
| high Tg dispersion (Fox Tg 40° C.) | 74.8 | 24.3 | 0.9 | 62 | 566 nm |

After evaluation as in Example 10 the soil resistance was rated as very good. The 60° C. gloss of the paint was 20.

Examples 22–23

These examples are within the scope of the present invention and demonstrate that good soil resistance may be obtained when latexes prepared as in Example 19 are used according to our invention. Paint was prepared and tested as for Example 19 after including 5% of Texanol to obtain adequate film formation.

| Example No. | low Tg:high Tg | 60° gloss (initial) | Soil Resistance |
| --- | --- | --- | --- |
| 22 | 1:1 | 71 | fair/good |
| 23 | 0.7:1 | 73 | fair/good |

Example 24

This example illustrates improved soil resistance in a storing composition used as a Coil Coating. A paint was made according to Example 10 using Examples 3A(Tg −15° C.) and 3E(Tg +90° C.) which were blended at a ratio of 0.7:1. 3.5% of the solid latex was replaced with Jeffamine ED600 (polyoxyalkylene diamine) to enable a crosslinked film to be formed. The paint was drawn down on a primed Zincalume panel and pre-baked for 60 seconds @65° C. then baked to a peak metal temperature of 232° C. in another 30 seconds. The paint had an initial 60° gloss of 21, a pencil hardness of F and was rated as good for soil resistance compared to a conventional polyester coil coating of similar PVC, gloss level, the same pencil hardness and which was rated as very poor.

We claim:

1. An aqueous coating composition comprising a blend of a low Tg and a high Tg aqueous polymeric dispersions wherein the PVC of the coating composition as measured by opacity is less than the critical PVC, the polymer dispersion with low Tg has a Tg less than 0° C., the polymer dispersion with high Tg is non film-forming, has a Tg of at least 35° C. and the volume ratio of low Tg polymer dispersion to high Tg polymer dispersion is from 0.4:1 to 1.4:1.

2. An aqueous coating composition as defined in claim 1 wherein the volume ratio of low Tg polymer dispersion to high Tg polymer dispersion is from 0.6:1 to 1.2:1.

3. An aqueous coating composition as defined in claim 2 wherein the volume ratio of low Tg polymer dispersion to high Tg polymer dispersion is from 0.7:1 to 1.1:1.

4. An aqueous coating composition as defined in any one of claims 1–3 wherein the low Tg dispersion has a Tg in the range −60° to −5° C.

5. An aqueous coating composition as defined in claim 4 wherein the low Tg dispersion has a Tg in the range −20° to −10° C.

6. An aqueous coating composition as defined in any one of claims 1–5 wherein the high Tg dispersion has a Tg in the range 45°–90° C.

7. An aqueous coating composition as defined in claim 6 wherein the high Tg dispersion has a Tg in the range of 50°–70° C.

8. An aqueous coating composition as defined in any one of claims 1–7 wherein the particle size of the aqueous dispersions is 200 nm maximum.

9. An aqueous coating composition as defined in claim 8 wherein the particle size of the aqueous dispersions is 100 nm maximum.

10. An aqueous coating composition as defined in any one of claims 1–9 wherein the aqueous dispersions include copolymerised acetoacetoxyethyl methacrylate (AAEM).

11. An aqueous coating composition as defined in any one of claims 1–10 further comprising opacifying pigment and having a gloss of at least 40 (60° head).

12. An aqueous coating composition as defined in claim 11 that complies with zero VOC requirements for low pollution paints.

13. A method of improving the soil resistance of a gloss or semi-gloss paint with aqueous dispersion polymer binder by replacing the disperse polymer binder by a binder as defined in any one of claims 1–10.

* * * * *